Jan. 12, 1960 N. L. EMMONS 2,920,725
PORTABLE COLLAPSIBLE DERRICKS
Filed Aug. 8, 1955 8 Sheets-Sheet 1

INVENTOR.
NEAL L. EMMONS
BY
Arthur Robert
ATTORNEY

Jan. 12, 1960 N. L. EMMONS 2,920,725
PORTABLE COLLAPSIBLE DERRICKS
Filed Aug. 8, 1955 8 Sheets-Sheet 2

INVENTOR.
NEAL L. EMMONS
BY
ATTORNEY

Jan. 12, 1960     N. L. EMMONS     2,920,725
PORTABLE COLLAPSIBLE DERRICKS
Filed Aug. 8, 1955     8 Sheets-Sheet 4

INVENTOR.
NEAL L. EMMONS
BY
ATTORNEY

Jan. 12, 1960  N. L. EMMONS  2,920,725
PORTABLE COLLAPSIBLE DERRICKS
Filed Aug. 8, 1955  8 Sheets-Sheet 8

INVENTOR.
NEAL L. EMMONS
BY
ATTORNEY

United States Patent Office 2,920,725
Patented Jan. 12, 1960

2,920,725

PORTABLE COLLAPSIBLE DERRICKS

Neal L. Emmons, Louisville, Ky., assignor to Reynolds Metals Company, Louisville, Ky., a corporation of Delaware Application August 8, 1955, Serial No. 527,089

11 Claims. (Cl. 189—11)

Portable collapsible derricks of various types are commonly transported today from one location to another as needed for use in earth drilling and other operations requiring the temporary use of a derrick. One most commonly used type of structure conventionally comprises: (1) a wheeled transportation vehicle; (2) a pair of parallel extensible-retractable derrick poles, each composed of two telescopic sections; (3) crown block means, adjacent the front or upper ends of the poles rigidly connecting their upper sections together in spaced parallel relationship; (4) means mounting the poles on the vehicle in a horizontally extending transportation position, in which they are fully collapsed; (5) hinge means pivotally connecting the lower sections to the vehicle, at corresponding and fixedly spaced points located toward but spaced from their rear or lower ends, for angular movement in a collapsed state from their transportation position to a vertically inclined position, in which they can be readily anchored firmly on the ground while remaining pivotally attached to the vehicle; the hinge and crown block means cooperating to hold the poles in fixed spaced parallel relationship; (6) pole raising means on the vehicle to swing them between their transportation and inclined positions; (7) pole extending means on the vehicle to extend the vertically inclined poles upwardly into an inclined operative position in which their upper ends overhang the work space which lies immediately adjacent the rear side of their lower ends; (8) latch means to lock them releasably in their extended positions; and (9) a tubing board mounted on the derrick to provide an elevated platform for one or more workers.

It is desirable to make these structures as large as is reasonably possible since their usefulness increases with the magnitude of their maximum load carrying capacity. On the other hand, highway transportation regulations tend to restrict the size of these structures by imposing legal limits on their length, width and height. These limits, if exceeded, make it necessary to secure, for each trip, a special transportation permit, which prevents travel during the night and on Sundays and Holidays. Consequently, in designing these structures, usefulness and transportation facility must be balanced against each other with usefulness regarded as the prime factor. This has, heretofore, resulted in all heavy duty derricks exceeding the legal limits.

The principal object of this invention is to provide a portable collapsible derrick structure of the telescopic double pole type which is of novel structure rendering it lighter in weight and substantially increasing its maximum load carrying capacity for a given length, width and height.

Another important object is to provide this type of derrick in a novel form which enables it to be made of a size small enough to come within the legal limits of most, if not all, of the major oil producing states, and of a capacity large enough to service all oil wells, for example, ranging up to 10,000 feet in depth, this range embracing 80% more or less of all producing wells in the United States today.

Other important objects are: to improve the structure of the poles from a standpoint of weight, strength and rigidity; to provide a novel and improved hinge means for pivotally connecting the poles to the vehicle; to provide a new and novel arrangement for extending and telescoping or retracting the poles; and to provide an improved latch mechanism for locking the extended sections releasably in operably extended positions.

A further object is to provide a three section structure which, as desired, may be either fully extended to three section length to provide a derrick structure of one order of maximum capacity or partially extended to two section length to provide a derrick structure of substantially higher capacity.

Another object is to provide a structure having a work space of greater height than heretofore for a given overall height.

The invention is illustrated in the accompanying drawings wherein.

The construction illustrated in the drawing comprises: a vehicle, derrick poles; crown block means; mounting means; hinge means; pole raising means; pole extending means; latch means; and a tubing board.

Figure 1:
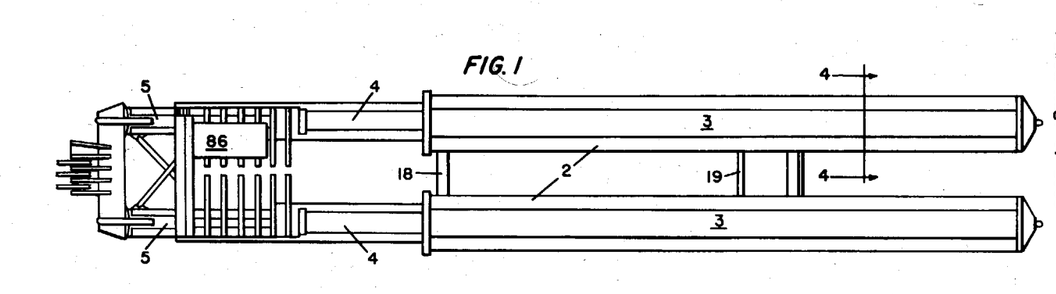
Figure 1 is a top plan view of a portable, collapsible derrick in the transportation position, this structure being constructed in accordance with my invention.
Figure 2:
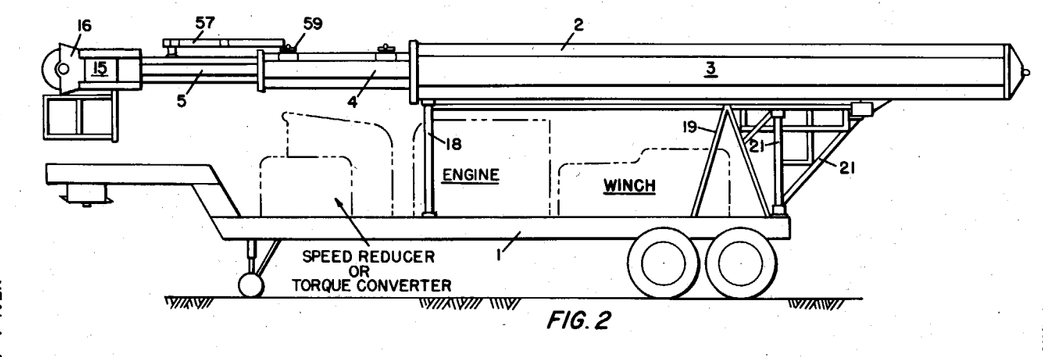
Figure 2 is a side elevational view of the derrick shown in Figure 1.
Figure 3:
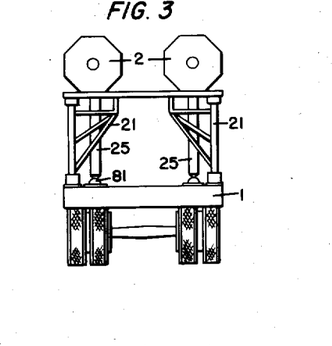
Figure 3 is a rear end elevational view of the structure shown in Figures 1 and 2.

*Vehicle—Figs. 1–3*

The vehicle 1 comprises a trailer chassis which is also designated 1. It is, of course, suitably wheeled and it may be self propelled although, as shown, it is designed for conventional connection to a tractor. The vehicle carries a suitable form of engine for driving a winch through a conventional speed reducer or torque converter, these parts being indicated in dotted lines.

Figure 4:
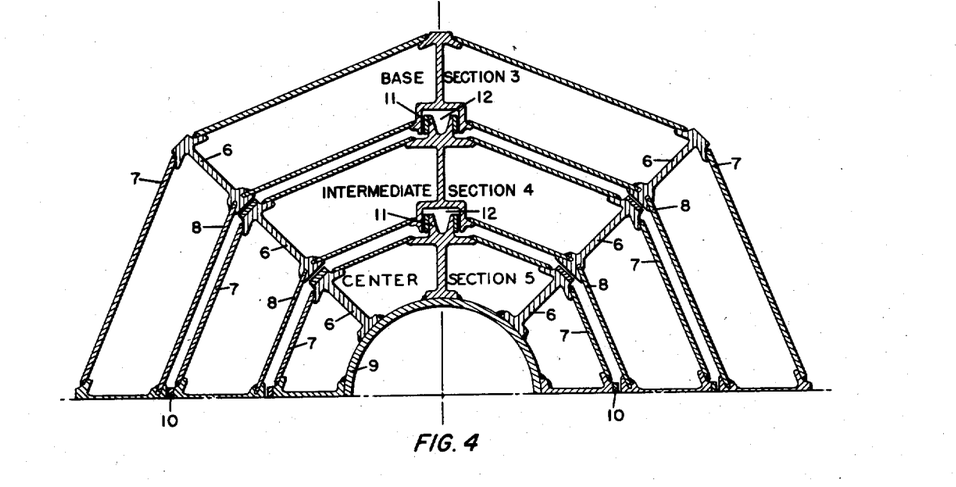
Figure 4 is a section taken along line 4—4 of Figure 1 but omitting the lower half of the section which is identical to the upper half thereof.

Derrick poles (Fig. 4)

The derrick embodiment illustrated is of the telescopic double pole type. Both poles 2 are identical in structure. While each pole 2 may be composed of only two telescopic sections, three sections are preferred; hence, three sections, comprising an outer base section 3, an intermediate section 4 and a center section 5, are described and illustrated. Each section is of double wall construction, having radially spaced inner and outer walls.

As illustrated in Figure 4, the outer base section 3 comprises: an annular series of circumferentially spaced, parallel elongate beams 6, similar to I-beams, arranged with their major transverse planes extending radially; a series of elongate outer plates 7, one for the space between each pair of beams, each outer plate 7 extending longitudinally along and transversely across the outer face of the space between its pair of beams and being rigidly secured to each beam, the outer plates 7 and the outer ends of the beam 6 cooperating to form the outer octagonally shaped cylindrical wall of the base section 3; and a similar series of elongate inner plates 8 similarly arranged and secured relatively to the inner ends of the beams and cooperating therewith to form the octagonally shaped cylindrical inner wall of the base section.

The intermediate section 4 is cross-sectionally smaller than the outer base section 3 but otherwise identical in structure; hence has elongate beams 6, outer plates 7 and inner plates 8.

The central section 5 is cross-sectionally smaller than the intermediate section. It is constructed identically to the intermediate and outer sections except that, in place of eight octagonally arranged inner plates 8, it uses one inner elongate pipe 9, of circular cross section. The inner ends of its beams 6 are welded to the peripheral surface of the pipe 9.

While the foregoing telescopic sections may be composed of any suitable material, such as steel, the novel double wall structure described and illustrated provides them with such great strength and rigidity as to make possible the use of the light metals such as aluminum, magnesium and their alloys. With aluminum, for example, a savings in weight, ranging from 25 to 40%, can be obtained over steel for the same capacity.

The corresponding beams 6 of the several sections are radially aligned in the retracted or telescoped position and the adjacent ends of such beams are intended to have sliding contact during extension and retraction; hence wherever such contact occurs, a bearing strip 10 of steel, brass or other suitable metal is interposed and secured to one of the beams.

The inner and intermediate sections should be guided during extension and retraction; hence adjacent sections are designed to provide cooperating tongue and groove guiding connections between them at a suitable number of points. Accordingly the base and intermediate sections 3 and 4 cooperate, at diametrically opposite locations, to provide sliding tongue and groove connections comprising a tongue 11 on the intermediate section and a groove 12 on the base section.

The intermediate and center sections are similarly provided with diametrically opposite, sliding tongue 11 and groove 12 connections. Preferably these tongue and groove connections are provided between adjacent beams 6 since the appropriate beam shapes can be readily extruded.

Figure 5:
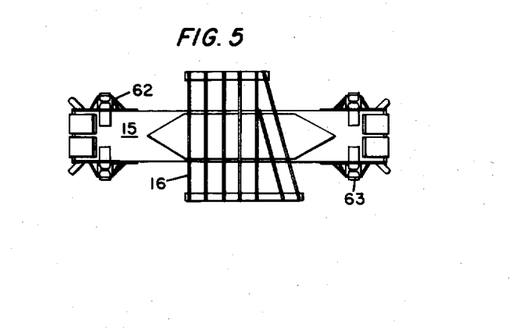
Figures 5–7 are top plan, side elevational and end elevational views, respectively, of the crown block (front or upper) of the derrick.
Figure 6:
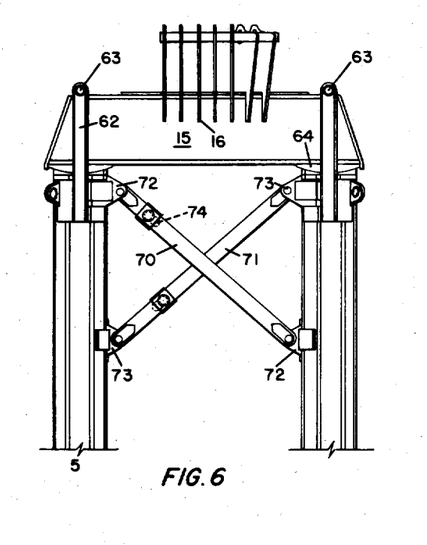
Figure 7:
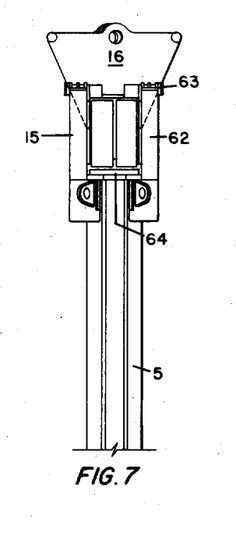

Crown block means Figs. 5-7

The front or upper ends of the poles 2 are connected together by a traversely extending crown block member 15 which abuts the projecting end of the center section 5 of each pole and is secured thereto. This crown block comprises: a cross member also designated 15; and a series of plates 16 which cooperate to support the crown block pulleys.

The specific manner in which the crown block is secured to the poles is a feature of my invention which will be later described.

Mounting means Figs. 1-3

The means for mounting the poles on the vehicle in a horizontally extending transportation position, in which both poles are fully collapsed, comprises: a stationary front frame member 18 of inverted U shape mounted on vehicle 1 with its bight in position to engage the underside of the base section 3 at its front end; and another stationary center frame member 19, having a cross bar corresponding to the bight of 18, in position to engage the underside of the base section near its center.

Figures 8, 10:
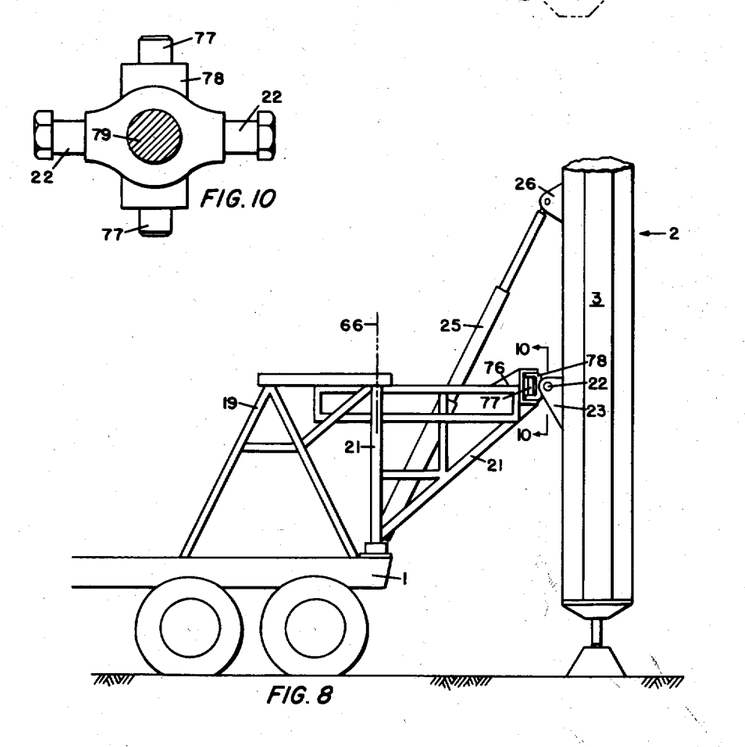
Figures 8–10 illustrate the manner in which each pole is hinged to the vehicle, Figure 8 being a fragmentary side elevational view showing the upper and lower (or front and rear) hinges, Figure 9 being a fragmentary and somewhat schematic top plan view of the structure shown in Figure 8 and Figure 10 being a detail of the lower (or rear) pole hinge.
Figure 9:
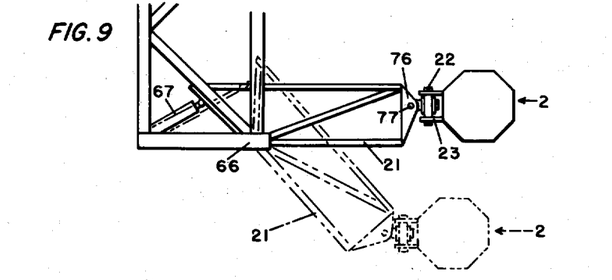
Figure 11:
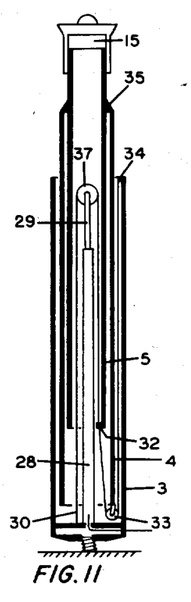
Figures 11–14 are schematic views showing the relationship of the various sections to each other and to the pole raising means during extension and retraction, the derrick being shown as fully retracted in Figure 11, partially extended or retracted in Figure 12, fully extended to three section height in Figure 13 and retracted to two section height in Figure 14.
Figure 12:
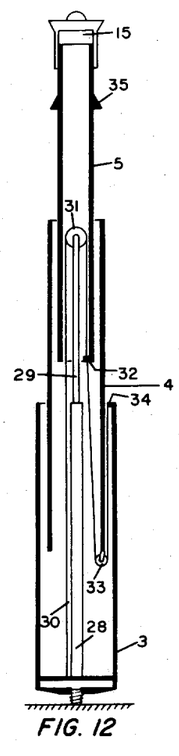
Figure 13:
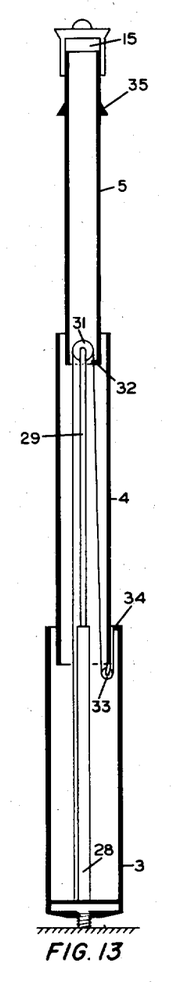
Figure 14:
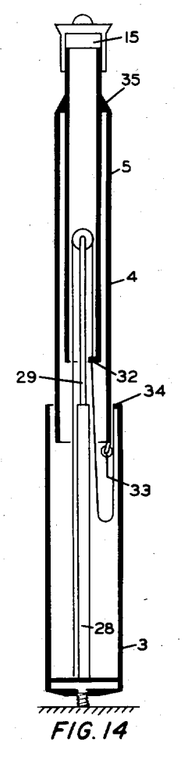

Hinge means Figs. 8-10

The hinge means pivotally connecting the poles for angular movement from their transportation position to a vertical position includes a pair of wing frame sections 21, of general triangular shape, one for each pole. Each triangular wing frame 21 projects rearwardly from a rear corner of the vehicle. It has its apex at the bottom of a vertical member which is located at the rear corner of the vehicle, this member forming a part of the wing frame and also being designated by the number 21. The vertical wing frame member 21 may be, and preferably is, adequately reenforced and anchored to the vehicle through suitable conventional means, which, for the most part, is omitted for the sake of clearness. Each triangular frame 21 extends rearwardly underneath its pole with its rear end hinged to that pole through horizontal hinge pin 22. The ends of pin 22 are supported by a spaced pair of gusset plates 23 which are rigidly secured to the pole.

Figures 22, 23:
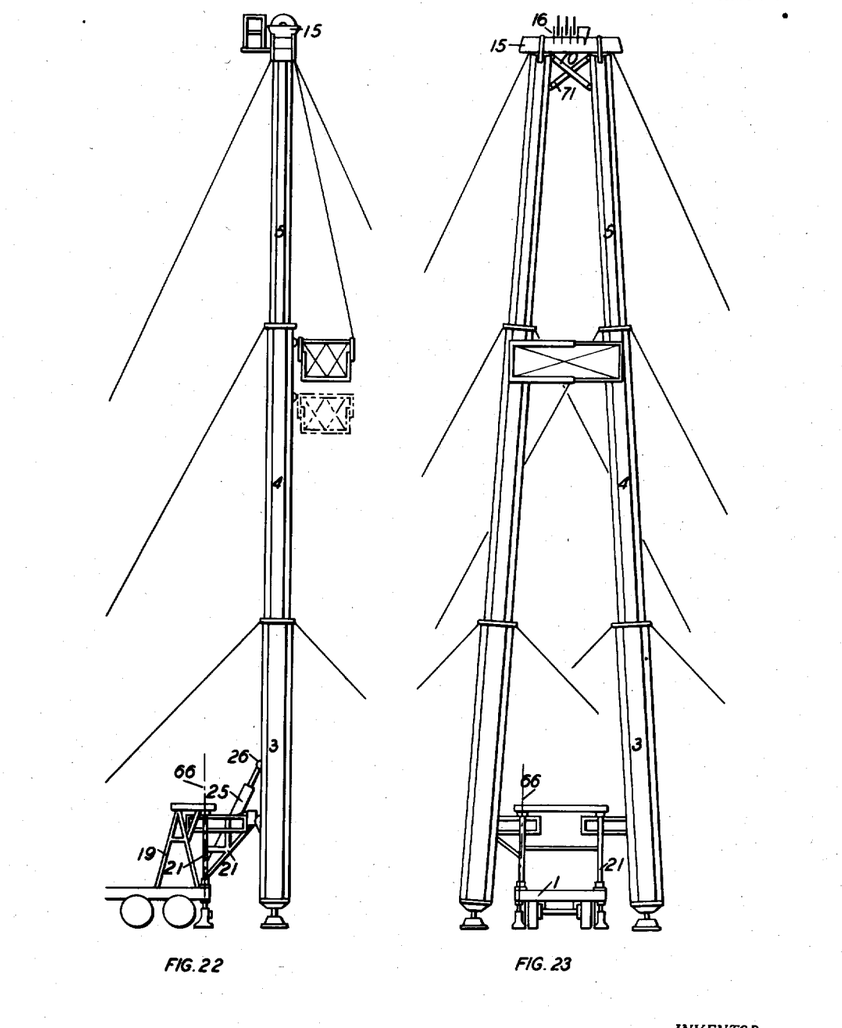
Figures 22 and 23 are somewhat schematic side and rear elevational views of the derrick extended to full three section length and ready for operation.

Pole raising means (Figs. 8 and 22)

The vehicle carries a hydraulic jack 25 for each pole, the cylinder 25 of this jack being hinged to the rear end of the vehicle and the piston of the jack being hinged at 26 to the corresponding pole. When these jacks 25 are retracted, the poles extend in the horizontal transportation position. When the jacks 25 are actuated, through a hydraulic system not shown, the poles 2 swing to the vertical position in which they may, and preferably do, extend at right angles to both the major horizontal plane of the vehicle and the surface of the ground.

Pole extending means Figs. 11-14

The means on the vehicle to extend the vertical poles 2 upwardly into an operative fully extended position includes: a hydraulic jack 28 centrally positioned within the bottom section with its cylinder, also designated 28, extending substantially throughout the length of that section and with its retracted piston 29 projecting upwardly into the center section; and a cable 30 anchored at one end to the base section 3 or to the cylinder 28 and extending from that anchorage upwardly around upper pulley 31 which is carried by the projecting end of piston 29, thence downwardly to the bottom of the center section 5 to which it is anchored at 32, thence continuing downwardly to, and passing around lower pulley 33 which is mounted on the lower end of the intermediate section 4 and finally extending upwardly to the top of the outer base section 3 where it is anchored at 34.

Now when the hydraulic system (not shown) for cylinder 28 is actuated, the piston 29 will be extended upwardly causing that run of the cable 30, between pulleys 31 and pulley 33, to rise thus not only extending the intermediate and center sections 4 and 5 relatively to the base section 3 but also simultaneously extending the center section 5 relatively to the intermediate section 4. In this way, both sections 4 and 5 reach their respective fully extended positions at the same time. Naturally the reverse operation will occur during retraction under the weight of the several parts.

If the derrick is to be extended to a two section height, as would be the case where working conditions permit or a substantially higher load carrying capacity is desired, it is necessary first to extend the parts fully, then latch the intermediate and base sections 3 and 4 together and finally retract piston 29 and the center section 5 along with it until the center section lugs 35 rest upon the upper end of the intermediate section 4. Ordinarily, if the derrick is designed for a maximum load handling capacity of 200,000 lbs. when fully extended, it will have a capacity of 300,000 lbs. when only partially extended as above described. The partially extended derrick must be once more fully extended in order to unlatch the connection between the base and intermediate sections before complete retraction.

*Latch means (Figs. 15–16)*

Figure 15:
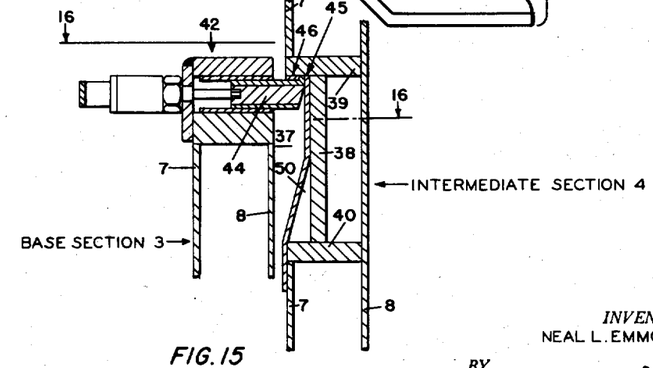
Figures 15–16 illustrate the manner in which the extended pole sections are latched together, Figure 15 being a fragmentary vertical sectional view through the latching member in its latching position and Figure 16 being a fragmentary sectional view corresponding to one taken along line 16—16 of Figure 15.
Figure 16:
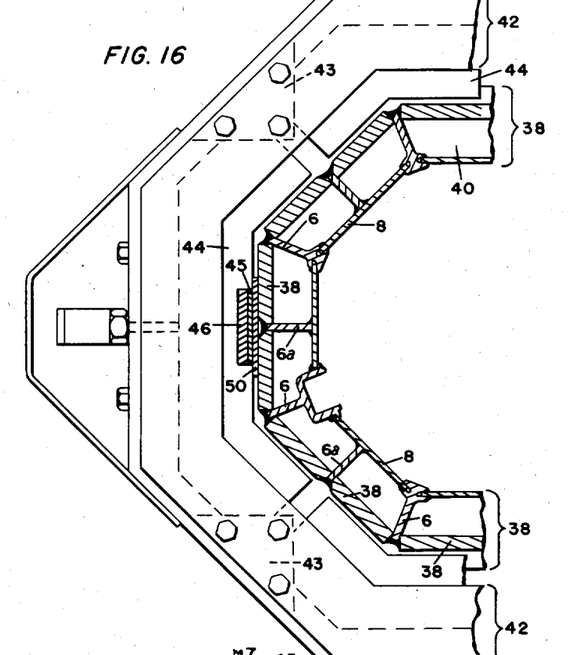
Figure 17:
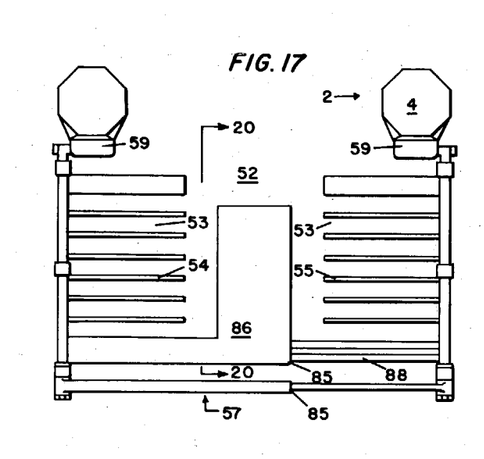
Figures 17–21 illustrate the tubing board, Figure 17 being a top plan view of the tubing board as it appears in use, Figure 18 being a front elevational view and Figure 19 an end elevational view of the tubing board as it appears in Figure 17, Figure 20 being a view corresponding to one taken along line 20—20 of Figure 17 and Figure 21 being a top plan view of the board when telescoped but not collapsed.
Figure 18:
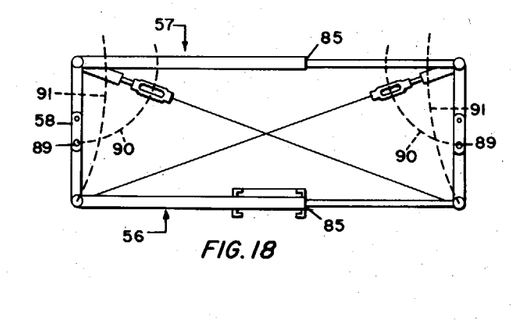
Figure 19:
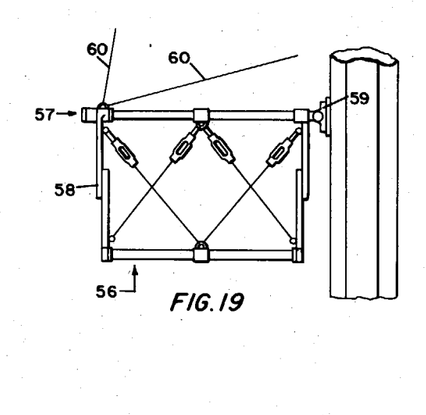
Figures 20, 21:
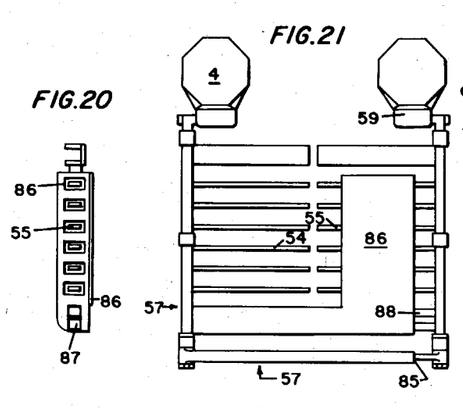

The latching means for the base and intermediate sections comprising: a latch receiving groove on one section; a latching mechanism or tongue on the other section; fluid operated means on said other section to move the tongue to its latching position in which it extends into said groove; and means on said one section for camming the tongue out of its latching position upon relative upward movement of said one section.

The upper end of the latch receiving groove 37 is located about, say, 4' above the extreme lower end of the intermediate section approximating, say, 36' in length. In forming this groove, a peripheral strip (8" wide) is removed from the outer wall 7 of the intermediate section and the corresponding end portions of the beams 6, including part of their webs are cut away to provide an endless circumferential space to receive an endless circumferential series of relatively heavy I-sections 38 composed of a vertical web, also designated 38, and upper and lower cap and foot plates 39 and 40. When the poles are raised, each web extends horizontally from the cut end of one beam 6 to the cut end of the next adjacent beam 6a and vertically across the height of the strip opening with its cap plate 39 closing the top of the strip opening and its foot plate 40 closing the bottom thereof. The beams 6a are interposed at and throughout the latching area for strengthening purposes, there being one beam 6a between each pair of beams 6. The I-sections 38 are, of course, suitably welded to the section 5.

The latching mechanism on the base section 3 comprises: a channel ring 42 of octagonal shape in peripheral outline and of inwardly open C-shape in cross section, mounted on and rigidly secured to the extreme upper end of the octagonal base section 3; triangular blocks 43 dividing the interior of the channel ring 42 into a series of parallel straight-sided pockets which open radially inward or toward the intermediate section; latching members or tongues 44 slidably mounted in each pocket for extension movement outwardly from the pocket, and, therefore, inwardly toward the intermediate section, to a projecting latching position in which it underlies the outer portion of the cap plate 39. In the embodiment shown, four pockets, four blocks 43 and four latching tongues are provided. Each tongue 44 has, on its upper surface along the central portion of its projecting end edge, a short horizontally extending upstanding rib 45 which, in the latching position, co-acts with a similar horizontally extending depending rib 46 on the under side of cap plate 39, to prevent the accidental retraction of the tongue out of its latching position. Each pocket has a wear plate above and another below the tongue and, as will be understood, the upper plate is recessed along its inner wall edge sufficiently to receive the rib 45 within the pocket and thus permit the full retraction of the tongue 44.

While any suitable means may be employed to unlatch the base and intermediate sections from each other through the retraction of tongue 44, it is proposed to raise the intermediate section a vertical distance approximating the vertical dimension of the strip opening and during this movement cause the tongue 44 to be retracted through engagement with a cam which pushes it back into its pocket. Accordingly, the central part of the web 38 of each I-section is provided with a wear or bearing strip 50, which, as it approaches foot plate 40, slants outwardly to the periphery of intermediate section to form a cam 50. Once the cam 50 rises far enough to push tongue 44 radially outward to the degree required to clear the intermediate section, then the movement of the intermediate section can be reversed and such section retracted to its telescoped position.

The latching means for the intermediate and center sections is identical to that employed for the base and intermediate sections; hence, a description of it does not appear to be necessary. It should suffice therefore to say that it includes the latching tongue, a latch or tongue receiving groove, fluid operating means and a cam and that its C-shaped ring is mounted on the extreme upper end of the intermediate section in the same manner as the corresponding ring 42 is mounted on the upper end of the base section.

*Tubing board—Figs. 17–21*

The tubing board is designed to provide, at the upper end portion of the intermediate section, a box-like platform having vertical side and front walls extending around the floor of the platform and being open at the top and rear. In preparing for a well drilling or servicing operation, a large footage of tubing, in sections, is stacked at one side of the working area with the upper end of each tubing section supported by the tubing board. To facilitate such handling of this tubing, as is involved in stacking it, and in delivering it section by section to the drilling or maintenance apparatus, all tubing boards are conventionally provided with a centrally-disposed longitudinally extending access slot 52 which is closed at its front end, which is open at its rear or access end and which, between ends, communicates, on each side, with a series of transversely extending stacking slots 53.

The tubing board illustrated, therefore, comprises: a parallel series of floor-forming slats 54 on one side forming a corresponding series of stacking slots 53 on the same side; a corresponding series of floor-forming slats 55 on the other side of the tubing board; and a vertically spaced pair of horizontal lower and upper U-shaped frames 56 and 57 connected together through vertical legs 58, one at each corner, each frame opening rearwardly and having its bight at the front. The slats 54 and 55 are carried by the oppositely disposed side members of the lower frame 56. The tubing board is mounted on the derrick poles by securing the rear and front corners to the poles respectively through rear corner connecting lugs 59 on the intermediate sections of each pole and front corner connecting cables 60 leading from the center section of each pole.

It is desirable to collapse the tubing board into a flat compact package; hence the vertical legs 58 are of the foldable jack-knife type enabling the floor to be moved upwardly into adjacent relationship with the upper frame 57. It is also desirable to swing the collapsed board from its projecting position shown in Fig. 19 to transportation position best shown in Fig. 2 in which it extends along the derrick poles rather than projecting outwardly therefrom; hence the rear corner connection to pole lugs 59 is made pivotal.

Diverging derrick poles
Figs. 22-23

Heretofore portable derricks of the single or double pole type have been extended to an operative tilted position in which their upper ends overhang the work space. A tilted derrick is objectionable for various reasons. One is that it places a load on the guy wires which hold the derrick to a given degree of tilt. More importantly, it reduces the maximum capacity of the derrick substantially from that value which can be safely carried by the same derrick in a truly vertical position.

According to the present invention, these objections can be and are overcome in a derrick of the double pole type by causing the derrick to stand in a truly vertical position with its poles diverging downwardly at an angle sufficient to provide ample working space between them.

In further accordance with the invention, the derrick poles are provided with the following: means pivotally connecting the poles to the crown block for angular movement from their straight parallel position to an operative position in which they so diverge downwardly as to be angularly spread apart a distance sufficient to provide ample working space between them; and means for so moving them. This novel arrangement also requires the hinge means, the pole raising means, and tubing board to be designed to accommodate the diverging movement of the poles.

Crown block pivotal connection
Figures 5-7

The crown block is pivotally connected to each pole through separate connections, each comprising: a pair of I-beams 62 welded or otherwise rigidly secured to the center section of the pole to project end-wise from the free end thereof with their projecting end portions extending across opposite vertical sides of the crown block to the top thereof; and means pivotally connecting the free ends of the I-beam 62 to the top of the crown block through a pivotal axis 63.

For load transmitting purposes, the crown block is made to rest on the free front or upper ends of the central sections, their contacting surfaces at 64 being cylindrically curved about pivot 63 to accommodate the pivotal diverging movement of the poles.

Pole diverging means
Figs. 8-10

The diverging movement of the poles is accomplished as follows: each rearwardly projecting wing structure 21, of the hinged means, is mounted for horizontal angular movement about the vertical axis 66 of its front vertical member 21; and a hydraulic jack 67 is mounted on the vehicle, one for each wing section, each jack being connected to its wing structure 21 and operative, when actuated, to swing its wing structure relatively away from the other wing structure to an outwardly oblique rearwardly extending position. The jacks 67 will be, of course, double acting so that they may be actuated in the reverse direction to return the poles to their parallel position. The actuating mechanism or the hydraulic system for these and other hydraulic jacks is not shown.

Means limiting the diverging movement
Figures 5-7

In order to limit the extent of the diverging movement and also rigidify the structure at the upper ends of the poles, cross braces 70 and 71, which are arranged to cross each other and thus form an X, are provided between and connected to the free ends of both central sections 5. The cross brace 70 is connected at opposite ends to a pair of lugs 72 comprising an upper lug 72 on one pole and a lower lug 72 on the other while the cross brace 71 is similarly connected to another pair of lugs 73. The brace 71 preferably is a single brace while brace 70 preferably is a double brace, i.e., it is composed of two single braces spaced apart to permit single brace 71 to cross between them. All braces are provided with a slot and pin connection 74, which limits the lengthening of the braces during the diverging movement and correspondingly restricts the extent of that movement.

Hinge means accommodating diverging movement
Figures 8-10

The pivotal connection of each wing structure 21 through horizontal axis 22 to gusset plate 23 must be swivelled to accommodate the swinging movement of the wing structure and the pivotal and diverging movements of the poles. Various forms of swivel joints may, of course, be provided for this purpose. The simple arrangement shown comprises: a bracket 76 on the rear end of wing structure 21, this bracket having a vertical axis 77 to accommodate horizontal swing movement of the wing; and an intermediate assembly 78 linking the wing to the pole. One end of the assembly 78 is pivotally connected to the bracket 76 for relative horizontal pivotal movement of the wing and the assembly about vertical axis 77. The oher end of this assembly 78 is pivotally connected to the horizontal axis 22 for relative vertical movement about horizontal axis 79 which is at right angles to axis 22. Therefore, assembly 78 can, while swinging horizontally about vertical axis 77, remain in a vertical position and yet accommodate the tilting movement of horizontal axis 22 between the true horizontal and the vertical canted positions it respectively occupies in the parallel and diverged positions of the pole.

In other words, a swivel joint is provided between the wing and pole, this swivel joint having one vertical axis 77 and two horizontal axes 22 and 79 at right angles to each other. The vertical axis 77 and the assembly 78 remain in a vertical position and the axis 79 remains in a horizontal position at all times but the position of the horizontal axis 22 will vary from its true horizontal position to a canted position between the horizontal and the vertical.

Pole raising means accommodating diverging movement
Figures 3, 8 and 22

Each pole raising jack 25 is connected at its piston end to the pole through connection 26. Its cylinder end is connected to the vehicle through connection 81. It should suffice to say that each of these connections, 26 and 81, should be swivelled in a manner permitting relative movement between these parts, when the poles are operatively positioned, on two horizontal axes at right angles to each other. The means by which this may be accomplished is so well known that further description or illustration is deemed unnecessary.

Tubing board accommodates diverging movement
Figures 17-21

Since opposite ends of each of the lower and upper frames 56 and 57 are secured to opposite pole members, the tubing board will lengthen and shorten transversely as the poles are transversely moved to the diverged position and returned to the parallel position. Accordingly the transversely extending bights of the lower frame 56 and the upper frame 57 are telescoped at 85 to accommodate such movement. To provide a floor member which is strong enough safely to carry the weight of the tubing board operator, one part of the bight of the lower frame 56 is provided by the leg of a substantially constructed L-shaped floor member 86, the foot of which projects rearwardly over the central portion of the access slot 52. The L-shaped floor member 86 is provided, at its heel with a pair of openings 87 which telescopically receive the other part of the bight of the lower frame member 56, this other part being in the form of a pair of floor members 88 projecting from and secured to the adjacent side member of the lower frame 56. The telescopic members 88 thus cooperate with the leg of member 86 to carry the weight of the tubing board operator and, at the same time, accommodate the lengthening and shortening movement of the tubing board.

Before passing it may be noted: that the bight of lower frame member 56 is located more to the rear of the tubing board than is the bight of the upper frame member 57; and that each pair of the folding legs 58 is connected to each other through a pivotal axis 89 which travels along arc 90 when the tubing board is folded, causing both front and both rear corners of the lower frame member to travel along arc 91. As a consequence, it is possible with this structure to position the lower frame 56 entirely within the confines of upper frame 57 and thereby minimize the vertical height of the derrick in the transportation position.

Operation

In operation, we assume that the poles are in their retracted horizontal transportation positions as shown in Figs. 1–3 and that the overall length shown is 49 to 50 feet, the overall height approximately 13 ft. and the overall width approximately 8 ft. If the vehicle is self-propelled, it will meet all transportation regulations. On the other hand, a tractor will normally add approximately 10 ft. to the overall length of the vehicle in which event it will meet the transportation regulations of all of the important oil producing states. In such states, the vehicle may be moved along the highways at any time in the same manner as any ordinary vehicle without any special permit so that transportation time and expenses are reduced to a minimum.

Upon arrival at the destination, the vehicle is maneuvered into position and the pole raising jack 25 actuated to raise the poles to a truly vertical position in which the longitudinal center lines of both poles lie in the same vertical plane as shown in Fig. 22. Guy wires will, of course, be applied to the poles. When the poles reach the vertical position in a collapsed state, the interior jacks 28—29 are actuated to extend them and the diverging jacks 67 are operated to diverge the legs either before or after the extension jacks are actuated, whereby the poles are brought into their final operative position shown in Figures 22 and 23.

As the poles are swung to the vertical position, diverged and extended, the tubing board will swing to its horizontal position, expand to its full depth and lengthen as its telescopically connected sections diverge. Now when the pole sections are latched together, the guy wires tightened and the rear corners of the vehicle as well as the bottoms of the poles, anchored on the ground through intermediate members, the derrick is ready for operation. In operation, the winches are operated to raise and lower the tackle block (not shown) through the crown block pulleys as required by the particular operations under way.

When fully extended it may project upwardly as much as 96 to 100 feet and when partially extended to 72 to 76 feet more or less. Since the pole diverges, the usable working space extends almost up to the cross braces 70 and 71. Since they extend vertically their load carrying capacity will be at a maximum.

It will be appreciated that, when operations have been finished, the poles may be quickly returned to their transportation position and the vehicle rapidly readied for movement to the next destination.

Having described my invention, I claim:

1. A portable derrick structure comprising: a derrick including a pair of derrick poles, a crown block and means pivotally connecting the upper end of both poles to the crown block to accommodate the movement of both poles relatively toward and away from each other between an inner position and an outer position in which the poles diverge away from said crown block; a transportation vehicle; means mounting said derrick on the vehicle and connecting it thereto for movement from a derrick transporation position, in which the derrick extends horizontally and the poles occupy their inner position, to an operating position, in which the derrick extends vertically and the poles occupy their outer diverging position, said mounting means including a first means pivotally connecting the lower ends of the poles to the vehicle for movement of the derrick between said horizontal and vertical positions and a second means pivotally connecting the lower ends of the poles to the vehicle for movement of the poles between their inner and outer diverging positions; a first operating means for moving the derrick between said horizontal and vertical positions; and a second operating means for moving the derrick poles between their inner and outer diverging positions.

2. The derrick structure of claim 1 wherein said mounting means includes: a wing structure for each pole, each wing structure being mounted on and supported by the vehicle and pivotally connected thereto for horizontal swinging movement about a vertical axis from which the wing structure extends rearwardly; and means pivotally connecting the upper rear portion of each wing structure to its pole.

3. The derrick structure of claim 1 including: cross brace means interconnecting the derrick poles near the crown block to compel equal relative movements between the crown block and each pole during the divergence of the poles and to restrict the extent of the outward diverging movement of each pole.

4. A portable collapsible derrick structure comprising: the derrick of claim 1 wherein each pole is composed of telescopic sections including an outer base section and another section slidably mounted within the base section for relative longitudinal movement from a telescoped position to an extended position; and means positioned within each pole for simultaneously extending the inner sections.

5. The structure of claim 4 including a tubing board comprising: a vertically spaced pair of horizontally extending lower and upper U-shaped frames, each having a front telescopic bight to accommodate diverging movement; and vertically extending legs supporting the lower frame from the upper frame, said legs being pivotally connected to each frame and to each other to accommodate the movement of the lower frame from its vertically spaced position to a collapsed position in which it extends adjacent the upper frame.

6. The structure of claim 5 wherein; the lower frame nests within the upper frame in the collapsed position of the tubing board.

7. The structure of claim 6 wherein: the bight of the lower frame lies on the rear side of a plane passing vertically and longitudinally through the bight of the upper frame; and said foldable legs cause the lower section to undergo some telescopic movement during movement from said vertically spaced position to said collapsed nesting position.

8. A portable collapsible derrick structure comprising: the derrick of claim 1 wherein each pole is composed of telescopic sections including an outer base section, an intermediate section slidably mounted within the base section and a central section slidably mounted within the intermediate section; and means positioned within each pole for simultaneously extending the intermediate section relatively to the base section and the center section relatively to the intermediate section.

9. The structure of claim 8 wherein said extending means includes: a jack anchored to the base section with its piston extending, when retracted, within the retracted center section; a cable extending from the lower end of the base section upwardly around the piston of the jack, thence downwardly to the lower end of the intermediate section and thence upwardly between the intermediate and base sections to an elevated point on the base section; means slidably connecting the cable to the jack piston and to the lower end of the intermediate section; and means anchoring the cable at spaced points along its length respectively to the bottom of the base section, the bottom of the center section and an elevated point on the base section.

10. The structure of claim 9 including: means for latching the extended intermediate section to the base section and the extended center section to the extended intermediate section.

11. The structure of claim 10 wherein: said extending means is operative to retract said center section to its telescoped position within said intermediate section when the sections are first fully extended, the base and intermediate sections are latched together and the intermediate and center sections are unlatched so as to form a partially extended derrick.

References Cited in the file of this patent

UNITED STATES PATENTS

| | | |
|---|---|---|
| 1,392,800 | Roberts | Oct. 4, 1921 |
| 1,511,679 | Schwarz | Oct. 14, 1924 |
| 1,928,009 | Dornier | Sept. 26, 1933 |
| 2,470,998 | McPherson | May 24, 1949 |
| 2,576,389 | Craighead et al. | Nov. 27, 1951 |
| 2,611,455 | Woods | Sept. 23, 1952 |
| 2,662,797 | Moon | Dec. 15, 1953 |
| 2,703,634 | Lee | Mar. 8, 1955 |
| 2,781,108 | Selberg et al. | Feb. 12, 1957 |